Jan. 8, 1935.   B. A. BENSON   1,987,356
ELECTRIC TOASTER
Filed May 31, 1934   3 Sheets-Sheet 1
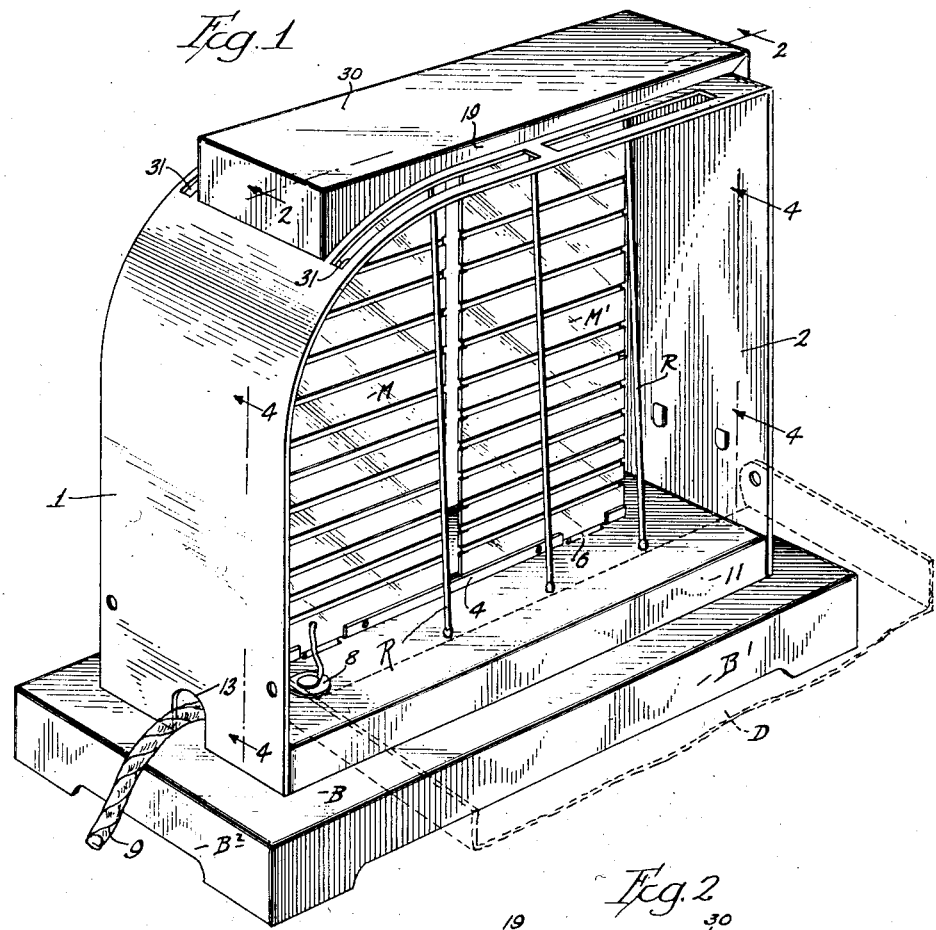
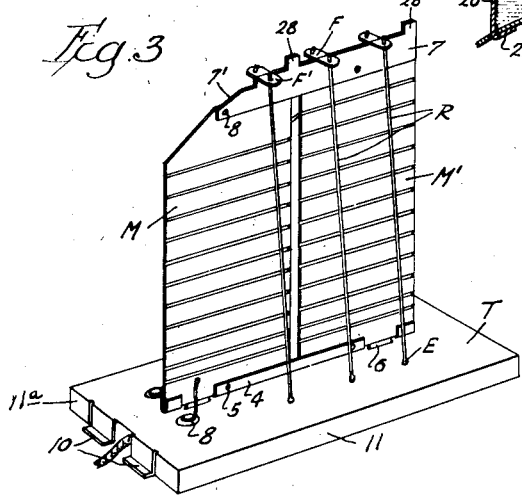
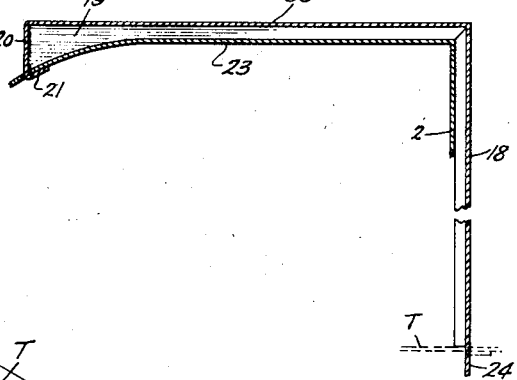
Inventor:
Bernhart A. Benson
by Albert Scheible
Attorney Jan. 8, 1935. B. A. BENSON 1,987,356
ELECTRIC TOASTER
Filed May 31, 1934 3 Sheets-Sheet 2
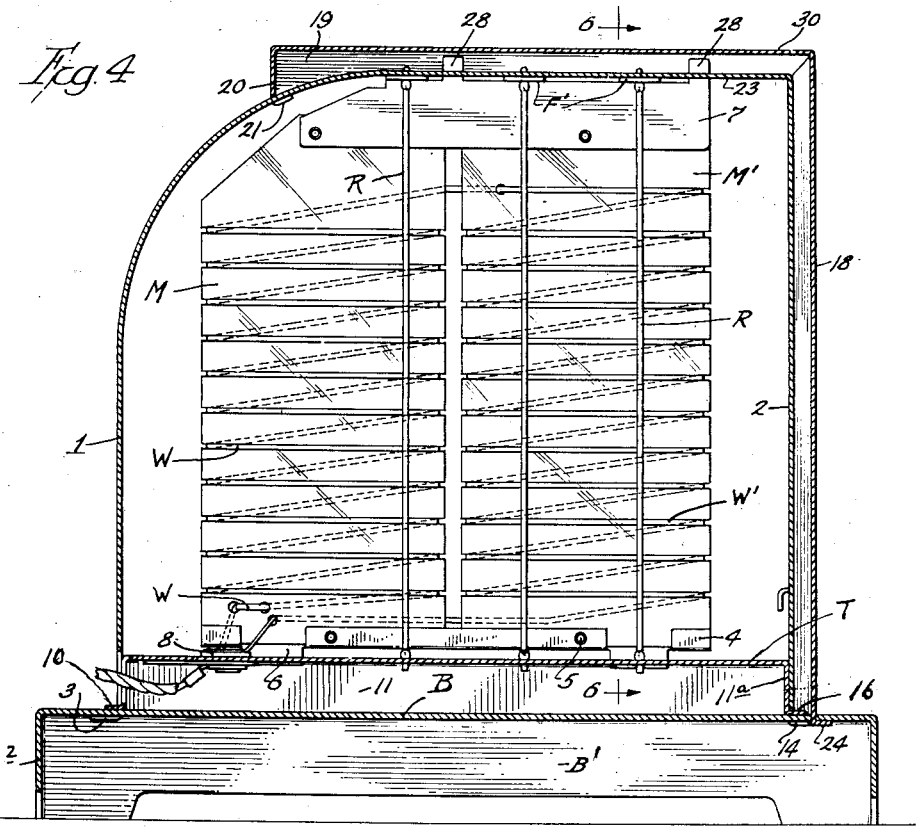
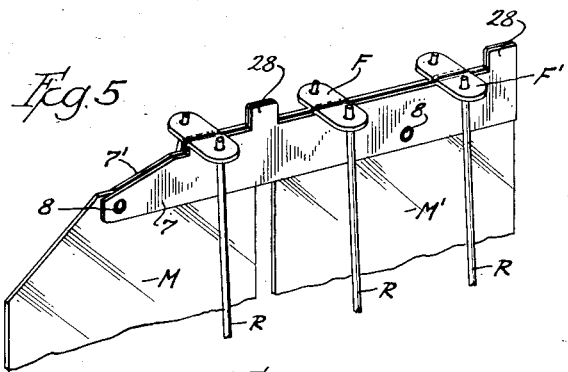
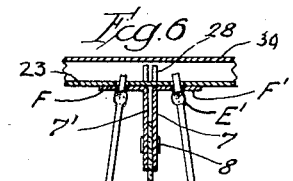
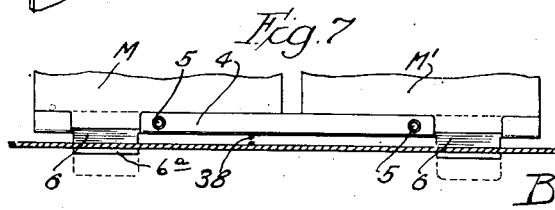
Inventor:
Bernhart A. Benson
by Albert Scheible
Attorney

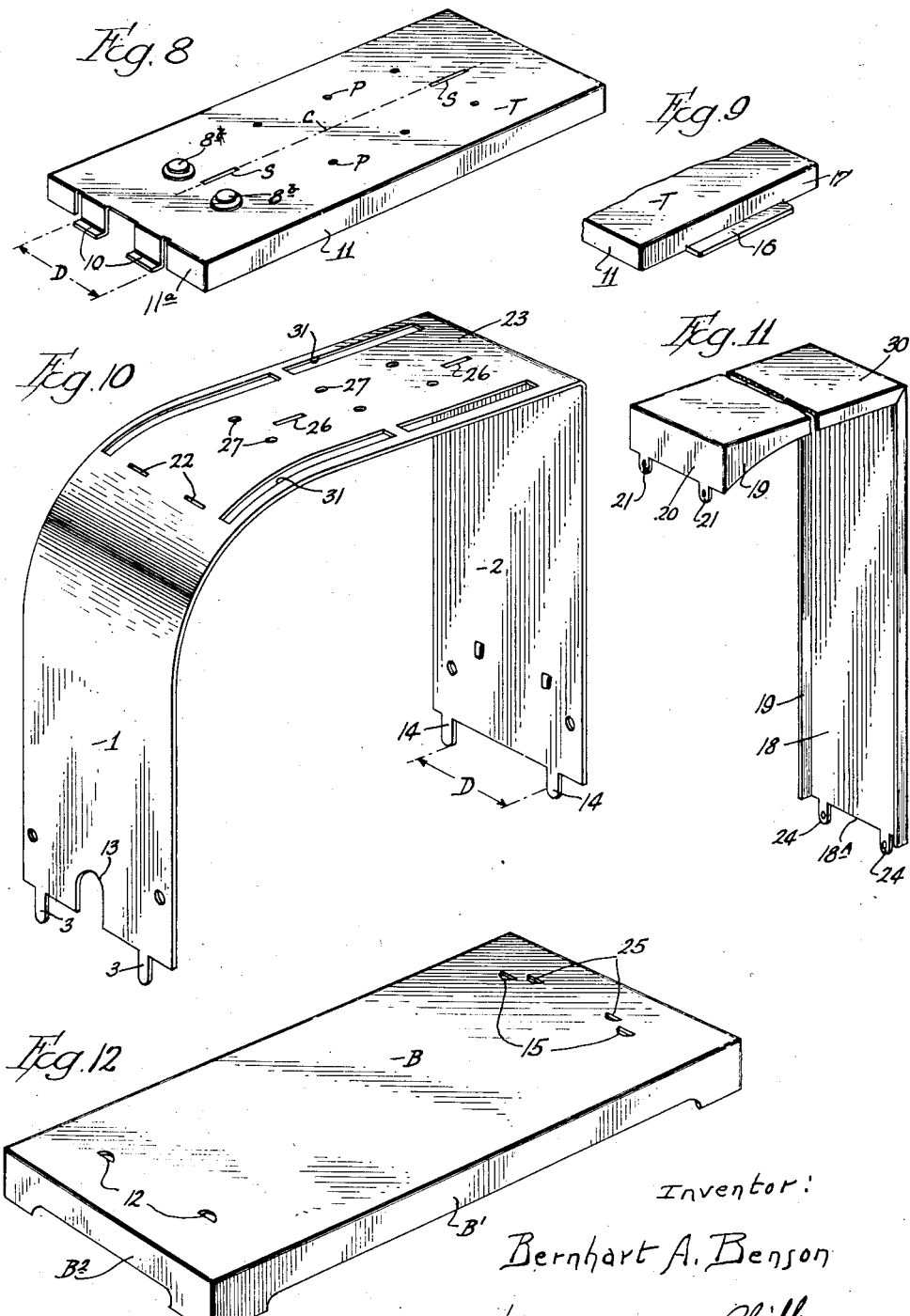

Patented Jan. 8, 1935

1,987,356

UNITED STATES PATENT OFFICE 1,987,356

ELECTRIC TOASTER

Bernhart A. Benson, Chicago, Ill., assignor to Chicago Electric Manufacturing Company, Chicago, Ill., a corporation of Illinois Application May 31, 1934, Serial No. 728,275

13 Claims. (Cl. 219—19)

My invention relates to electric toasters of the household type and in general aims to attain the following objects:

1. Providing an electric toaster construction in which a heating member of the wire-wound mica sheet type can be assembled with means for supporting it, so as to constitute a unit which can thereafter be mounted in the casing of the toaster.

2. Constructing the said unit so that the means for supporting the heating member will permit the expansion and contraction of the wire-supporting mica sheet with changes in temperature, thereby avoiding a buckling or fracturing of such a sheet.

3. Supporting the heating member from the base of the said unit by thrust rods disposed also for having the bread rest against them.

4. Constructing the said unit so that it can readily be interlocked, without the use of screws or rivets, with a casing which includes a base member and an inverted stirrup-like casing member mounted on the base member.

5. Providing simple and effective means for stiffening both the top and one shank of such a stirrup-like casing member, so as to secure rigidity even when this member is constructed of relatively thin sheet metal.

6. Constructing the said stiffening means so that the upper part thereof will afford an adequately heated hot-air storing chamber in the top of the casing, in order that toast laid upon the said upper part of the stiffening means will be effectively warmed.

7. Providing simple means whereby the attaching of such an inverted stirrup-like casing member to the base of the casing also secures the heating unit of the toaster to the said base.

Illustrative of the manner in which I accomplish the above recited objects as well as other objects of my invention, Fig. 1 is a perspective view of an electric toaster embodying my invention, including only a dotted showing of a part of the nearer door.

Fig. 2 is a vertical section through adjacent portions of the inverted stirrup-like casing member and of the casing-stiffening member, taken along the line 2—2 of Fig. 1.

Fig. 3 is a perspective view of the heating unit of the toaster before it is attached to the base of the toaster, drawn on a smaller scale than Fig. 1.

Fig. 4 is a vertical and longitudinal section through the entire toaster, taken along the line 4—4 of Fig. 1.

Fig. 5 is a perspective view of the upper portion of the heating member and of the thrust rods supporting the same, with the wire of the heating member omitted.

Fig. 6 is a fragmentary transverse vertical section taken along the line 6—6 of Fig. 4.

Fig. 7 is a vertical section taken along the line 7—7 of Fig. 6, with the thrust rods omitted, showing the lower portion of the heating member and the adjacent part of the secondary base member which supports the heating member and which forms the base of the heating unit.

Fig. 8 is a perspective view of the said secondary base member.

Fig. 9 is a perspective view of the end portion of the secondary base member which is at the right in Fig. 9.

Fig. 10 is a perspective view of the inverted stirrup-like part of the casing.

Fig. 11 is a fragmentary perspective view of the generally angle-shaped member which stiffens the stirrup-like casing part shown in Fig. 10, and the upper portion of which affords a hot-air storing chamber above the top of the casing part of Fig. 10.

Fig. 12 is a perspective view of the base member of the toaster.

In the illustrated toaster, the rectangular base of the casing is an inverted box-like base member (Fig. 12) presenting a horizontal base top B and depending sides and ends $B^1$ and $B^2$ respectively, these depending portions being of increased height at the corners of the base member so as to present legs.

Seated on the base top B is a relatively smaller secondary base member (Fig. 8) which also is an inverted rectangular box and which forms the base of the heating unit of the toaster, the top T of this heating unit base being provided with two alined slits 1 extending longitudinally and medially of the said top, and with two counterpart rows of spaced perforations P respectively at opposite sides of the longitudinal center line C of the said slits.

The heating element of the toaster comprises two high-resistance wires W and $W^1$ connected in series and respectively wound on two sheets of mica M and $M^1$, which sheets extend in a common upright plane and desirably are spaced from each other to permit air to flow between them, the extreme ends of the wires being fastened to terminals 8 to which the two wires of a circuit cord 9 (Fig. 1) later on are also fastened. Both of these sheets have their lower end portions straddled by a metal clamping strip 4 which is fastened to each sheet by a rivet 5, and this clamping strip has two fingers 6 formed from it and extending downwards respectively through the two alined slots S (Fig. 8) in the top T of the said secondary base.

Extending at opposite sides of the upper ends of both of the mica sheets M and $M^1$ are two upper clamp strips 7 and $7^1$ which are fastened to each other by rivets 8 extending respectively through the said sheets, and these clamp strips also have two pairs of adjacent upwardly extending tabs 28 adapted to extend slidably through alined slits 9 in the top portion 10 (Fig. 10) of a hereafter described inverted stirrup-like casing member.

In addition, the clamp strips 7 and $7^1$ have horizontal flanges F and $F^1$ extending respectively in opposite directions from the said strips, each of these flanges having a perforation corresponding to one of the perforations P (Fig. 8) in the secondary base, and the spacings between the said perforations in the flanges on each clamp strip being a counterpart of the spacing of the perforations P in each of the two rows of the latter.

Interposed between each of the flanges (F or $F^1$) and a secondary base perforation P is a thrust rod R which has its upper and lower ends extending slidably respectively through a perforation in one of the said flanges and through a base perforation P at the same side of the mica sheets with that flange, this rod having enlargements E and $E^1$ respectively engaging the upper face of the top T of the secondary (or heating-unit) base and the lower face of the flange (F or $F^1$) through which it extends.

These enlargements on each rod preferably are so spaced that when the rods support the said flanges, and thereby also support the wire-wound mica sheets M and $M^1$, the lower metal clamp or binding 4 on the said mica sheets will have its lower edge spaced sufficiently upward from the top S of the secondary base member even when the heating wires W and $W^1$ are cold. This spacing cooperates with the slidable extending of the fingers 6 on the (lower) clamping strip 4 through the said top S of the secondary base member to allow the mica sheets to be expanded in height by the heat of the heating wires (when current is flowing through the latter) without buckling the said sheets.

Each thrust rod R needs to extend only slightly at its upper end beyond the corresponding flange or an upper clamping strip, and at its lower end beyond the bottom of the said secondary base top, so that each rod (when of resilient wire) can be placed in position by inserting its lower end through a perforation P in the said unit base top and then bending the rod sufficiently to insert its upper end through one of the said flanges F or $F^1$. In practice, I also preferably bend the lower end portion of each finger 6 on the lower binding strip 4 (after these fingers have been slid downwardly through the slits S in the top of the said secondary or heating unit base) at right angles to the general plane of the said mica sheets, so that these finger portions 6a underhang the said base top T freely as shown in dotted lines in Fig. 6, thereby preventing the flanges on the upper clamp strips from sliding off the rods R if the heating unit is inverted before it is mounted in the casing of the toaster.

To eliminate the need of separate fastening elements for securing the above described heating unit of Fig. 3 to the top B of the toaster base of Fig. 12, I construct parts of the unit base of Fig. 1 so as to interlock with, and to be clamped down upon, the said toaster base by parts of the inverted stirrup-like casing member of Fig. 10. For this purpose I provide one end of the said unit base (of Figs. 3 and 8) with outwardly extending tabs 10 having their lower faces flush with the lower ends of the riser sides 11 of this base, these fingers being spaced apart to permit the circuit cord 9 (Fig. 1) to extend freely between them to the interior of the said base for connection to the terminals 8.

Then I provide the lower end of the adjacent riser shank 1 of the said inverted stirrup-like casing member with two downwardly directed fingers 3 which extend respectively through apertures 12 in the top B of the toaster base. These fingers are so spaced that portions of the lower end of the said shank 1 between the said fingers and a cord-admitting opening 13 in the said shank will seat respectively on the two tabs 10 so as to clamp the said tabs down on the toaster base. The oppositely facing edges of the two tabs 10 correspond in their spacing D to the spacing between the fingers 3 on the said casing member, whereby the base of the heating unit is prevented from moving transversely of the plane of the mica sheets W and $W^1$ with respect to the base of the toaster.

The companion shank 2 of the inverted stirrup-like casing member also has a pair of fingers (14) projecting downwardly from it and respectively slidably fitting two perforations 15 in the top B of the toaster base. These fingers 14 have the free spacing between them similar in width of a basal flange 16 (Fig. 9) on the corresponding end 17 of the heating-unit base, so that the lower edge portion 18 of the last-named shank will seat upon and clamp this tab to the toaster base when the fingers 14 are clinched against the lower face of the top B of the toaster base as shown in Fig. 1.

To stiffen the said inverted stirrup-like casing member against flexing, when it is made of thin metal, I employ a stiffening member which is angle-shaped in longitudinal section and channel-shaped in transverse section, as shown in Fig. 11, this stiffener being proportioned so that its upright portion will extend along the entire height of the riser shank 2 of the said casing member and so that its horizontal shank will extend above the top 23 of that casing member.

This stiffener has the free edges of its channel webs 19 formed so as to fit against the outer face of adjacent parts of the said casing member, and has its channel closed at the free end of its upper shank by a web 20 having two downwardly projecting fingers 21 which can be clinched through correspondingly spaced slots 22 in the top of the said inverted stirrup-like casing member, as shown in Fig. 1.

The upright shank 18 of the inverted stirrup-like casing member is of such a length that when its said lower edge 18 A clamps the bottom flange 16 on the heat-unit base against the top B of the toaster base, the free edges of the channel webs 19 of the stiffener (which has previously been secured at one end by the fingers 21 to the said casing member) will bear against that casing member for the entire length of the said channel webs, so that this stiffener can be rigidly fastened to both the said casing member and the base top B of the toaster by clinching two fingers 24 which project downwardly from the lower end of this upright shank 18 respectively through two apertures 25 in the said toaster base top. These fingers 24 are spaced so as to fit against the side edges of the basal flange 16 (Fig. 9) on the heat-unit base, thereby preventing that end of the last named base from shifting on the toaster base.

The top part 23 of the inverted stirrup-like casing member is also provided with two alined slots 26 through which the pairs of tabs 28 (Figs. 5 and 6) on the upper binding of the heating member slidably extend when the said casing member is fastened to the toaster base with the heating unit centered under it by the previously described interfitting parts of the base of that unit and the downwardly extending fingers 3 and 14 on the said casing member. The interfitting of these tabs 28 with the slots 26 then prevents the upper portion of the heating unit from shifting in a vertical plane at right angles to the faces of the mica sheets W and W¹.

In addition to the said slots 26, the top 23 of the said casing member also has ports 27 formed in it, through which ports some of the rising hot air readily enters the space between that top and the interior of the channel-sectioned stiffener. Consequently, this space forms a hot-air storing chamber when the toaster is in operation, so that toast laid on the top portion 23 of the stiffener will readily be kept warm, and to facilitate such a warming of the toast I preferably make the said stiffener top 23 horizontal for its entire area, even though the top member 23 may be more or less curved in longitudinal section for the sake of ornamental appearance.

When completely assembled, my toaster also includes the usual two pivoted side doors, one of which is indicated merely in dotted lines at D in Fig. 1, and the top part 23 of the inverted stirrup-like casing member desirably is provided with slots 31 through which hot air from the space between the two doors can issue.

Since the heating unit of my toaster can be completely assembled (as in Fig. 3) before this unit is placed on the base member of the toaster, I avoid the difficulties encountered with the usual constructions in which a heating element is strung back and forth between hooks on the base member and other hooks supported at higher elevation, as the assembler does not reach into the interior of the casing of my toaster during the positioning of the heating element. By having the ends of the (secondary) base of the heating unit abut respectively against the two riser shanks 1 and 2 of the inverted stirrup-like casing member when the latter is thereafter attached to the base member of the toaster, and by having the depending fingers 3 on one of the said shanks fit against the oppositely facing edges of the flanges 10 on one end of the secondary base, while the fingers 14 on the other shank likewise fit against the side edges of the flange 16 on the secondary base, I insure an exact and firm positioning of the secondary unit on the base member of the toaster.

Moreover, by constructing the said secondary base as an inverted box having its ends 11a as well as sides 11 seated on the base member of the toaster, I cause the interior of this secondary base to cooperate with the top B of the said base-member to form an air chamber between base member and the entire interior of the casing of the toaster, thereby reducing the downward radiation of heat so as not to affect the finish of a table on which my toaster is seated.

However, I do not wish to be limited to details of the construction and arrangement which I have recited in describing a particular embodiment of my invention, since many changes might be made without departing either from the spirit of my invention or from the appended claims.

I claim as my invention:

1. A heating unit for an electric toaster in which the heating member is upright, comprising a base having a horizontal top; a heating member including a generally sheet-like part presenting upright flat faces, and a resistance wire supported by the said part, the said generally sheet-like part having downwardly extending fingers and the top of the said base having a slot through which each such finger slidably extends; and struts operatively interposed between upper portions of the said sheet-like part and the said base top for sustaining the weight of the heating member.

2. A heating unit as per claim 1, in which the struts are of such a length with respect to the height of the heating member that the said member has its lower end freely spaced upwardly from the top of the said base.

3. A heating unit as per claim 1, in which the said generally sheet-like part of the heating member includes flanges extending laterally in respectively opposite directions from the upper portion of the heating member, and in which the struts are interposed respectively between one and the other of the said flanges and the said base top.

4. A heating unit as per claim 1, in which the heating member includes two metal strips fastened respectively to the opposite sides of the said sheet-like member, each of the said strips having a flange extending laterally outward; and in which the struts are disposed in two rows respectively at opposite sides of the said member, the struts at one side of the heating member converging upwardly toward the struts at the other side of the heating member, and the struts at each side of the heating member alining with each other to constitute a grid against which a slice of bread may rest while being toasted.

5. A heating unit as per claim 1, in which each of the said fingers has its lower end portion bent to form a hook tip normally spaced downwardly from the said base top and disposed for engaging the lower face of the said base top to limit the raising of the heating member with respect to the base top during the assembling of the unit.

6. In an electric toaster, a casing including a base member and an inverted stirrup-like member formed of a generally flat metal strip and having the lower ends of its U-shanks fastened to the said base member; and a heating unit conjointly housed by the said two members and including a secondary base seated on the said base member of the casing; the said secondary base having a flange projecting outwardly from each end thereof and seated on the top of the said base member, and each of the said U-shanks having a portion of its lower end seated on one of the said flanges to clamp the secondary base to the base member.

7. In an electric toaster, an assemblage of elements as per claim 6, in which each shank of the said inverted stirrup-like member has a pair of fingers projecting downwardly from it through and clinched to the base member, and in which the two fingers on each shank respectively engage the two side edges of the adjacent flange on the secondary base to position the latter definitely upon the said base member.

8. A heating unit for an electric toaster, comprising an inverted box-like base, two upwardly converging rows of struts supported by and extending upwards from the said base, a heating member suspended conjointly from the upper ends of the said struts and depending between the two rows of struts, the base having a row of slots underhanging the heating member and the heating member having downwardly directed fingers extending slidably respectively through the said slots.

9. A heating unit for an electric toaster, as per claim 8, in which the lower portions of each finger is bent to underhang a portion of the said base adjacent to the slot through which that finger extends; the proportioning of the recited elements being such that the bent finger portion is freely spaced downward from the said adjacent portion of the base when the heating member is cold, thereby permitting a lifting of the heating member by the longitudinal expansion of the thrust rods due to radiation from the heating member when the latter is hot.

10. In an electric toaster, an upright frame-like casing comprising a base member, two frame ends rising from the base member, and a top part spanning the upper ends of the frame ends; and a heating unit constructed separately from the said casing and comprising a secondary base seated on the said base part of the casing, and a heating member disposed above and supported by the said secondary base independently of the said frame ends and top part of the casing, the said top of the casing having a slot and the heating member having an upwardly directed tab extending slidably through the said slot.

11. In an electric toaster or the like, a casing comprising a base member, an inverted U-shaped member formed of a strip of metal bent flatwise and having the lower ends of its U-shanks fastened to the base member; and an angle-shaped and channel-sectioned stiffener having the free edges of the channel webs of its two legs bearing respectively against the top and against one shank of the said U-shaped member, the said stiffener being fastened at the free end of its upper shank to the U-shaped member and fastened at the free end of its other shank to the base member.

12. In an electric toaster, an upright frame-like casing including a base member, an inverted stirrup-like casing member having each of its shanks fastened to the base member, and a separately constructed heating unit including a secondary base seated on the said base member and having end portions thereof abutting respectively against the said shanks of the said casing member; the secondary base also have end portions thereof respectively underhanging parts of the said shanks so as to be clamped to the said base member by the fastening of the said shanks to the base member.

13. In an electric toaster, a casing including a base and a top member spaced upwardly from the base; an electric heating member disposed between the said base and top member; and an inverted box-like member overlying and fastened to the top member; the said box-like member having a horizontal and imperforate top portion adapted to support already toasted bread, and having the lower edges of its riser walls seated on the said top member so that the said two members cooperate in affording an air-storing chamber; the top member having apertures opening into the said chamber for admitting air which has been warmed by the heating member.

BERNHART A. BENSON.